United States Patent
Merrell et al.

(10) Patent No.: US 9,983,656 B2
(45) Date of Patent: May 29, 2018

(54) FINGERPRINT SENSOR WITH POWER SAVING OPERATING MODES, AND CORRESPONDING DEVICES, SYSTEMS, AND METHODS

(71) Applicant: Motorola Mobility LLC, Chicago, IL (US)

(72) Inventors: Thomas Merrell, Beach Park, IL (US); John J Gorsica, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days. days.

(21) Appl. No.: 14/986,328

(22) Filed: Dec. 31, 2015

(65) Prior Publication Data

US 2017/0192482 A1    Jul. 6, 2017

(51) Int. Cl.
*G06F 1/00*   (2006.01)
*G06F 1/26*   (2006.01)
*G06F 1/32*   (2006.01)

(52) U.S. Cl.
CPC ............ *G06F 1/325* (2013.01); *G06F 1/3215* (2013.01); *G06F 1/3231* (2013.01); *G06F 1/26* (2013.01)

(58) Field of Classification Search
CPC ...................................... G06F 1/32; G06F 1/26
See application file for complete search history.

(56) References Cited

U.S. PATENT DOCUMENTS

| | | | | |
|---|---|---|---|---|
| 8,249,557 B2* | 8/2012 | Xiao | ...................... | H04M 1/67 340/5.52 |
| 9,230,150 B1* | 1/2016 | Merrell | ................ | G06K 9/0002 |
| 2001/0009401 A1* | 7/2001 | Hayashi | ................ | G06F 1/3203 341/22 |
| 2002/0095586 A1* | 7/2002 | Doyle | ..................... | G06F 21/32 713/186 |
| 2005/0078855 A1* | 4/2005 | Chandler | ............ | G07C 9/00158 382/116 |
| 2008/0158168 A1* | 7/2008 | Westerman | ........ | G06K 9/00375 345/173 |
| 2012/0071149 A1* | 3/2012 | Bandyopadhyay | ... | G06F 1/1643 455/418 |
| 2012/0191993 A1* | 7/2012 | Drader | .................. | G06F 1/3215 713/320 |
| 2012/0211656 A1* | 8/2012 | Katz | ..................... | G01S 17/026 250/338.1 |
| 2012/0319959 A1* | 12/2012 | Saponas | ................ | G06F 3/0237 345/173 |
| 2014/0221051 A1* | 8/2014 | Oguri | ................ | H04W 52/0254 455/566 |
| 2016/0212710 A1* | 7/2016 | Ting | .................. | H04W 52/0254 |
| 2016/0219524 A1* | 7/2016 | Xu | ..................... | H04W 52/0251 |

* cited by examiner

*Primary Examiner* — Phil Nguyen
(74) *Attorney, Agent, or Firm* — Philip H. Burrus, IV

(57) ABSTRACT

A method in an electronic device having one or more processors operable a fingerprint sensor and one or more other sensors includes detecting, with a fingerprint sensor, false fingerprint data. After detecting the false fingerprint data, the method determines whether the electronic device is disposed within a pocket. Where the electronic device is disposed within the pocket, the method transitions the fingerprint sensor from an active mode to a low power or sleep mode.

20 Claims, 11 Drawing Sheets

FINGERPRINT SENSOR WITH POWER SAVING OPERATING MODES, AND CORRESPONDING DEVICES, SYSTEMS, AND METHODS

BACKGROUND

Technical Field

This disclosure relates generally to electronic devices, and more particularly to portable electronic devices with fingerprint sensors.

Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications, text messaging, Internet browsing, commerce such as banking, and social networking. The circumstances under which users of mobile communication device use their devices varies widely as well.

As these devices become more sophisticated, they can also become more complicated to operate. Designers are constantly working to find techniques to simplify user interfaces and operating systems to allow users to take advantage of the sophisticated features of a device without introducing complicated control operations. For example, some electronic devices are now being equipped with biometric sensors, one example of which is a fingerprint sensor. Rather than requiring a user to go through a series of steps, such as entering a personal identification number sequence, to unlock an electronic device, a user simply touches or otherwise interacts with a biometric sensor to identify themselves to the device. Biometric sensors thus simplify device operation by replacing a series of several steps with a simple touch operation. Such sensors also make it unnecessary to memorize a passcode, While the inclusion of devices such as biometric sensors can simplify complicated control operations, they are not without issues of their own. For example, they can consume large amounts of power when not in use. It would be advantageous to have an improved system having a biometric sensor, yet with reduced power consumption for extended battery life.

Figure 1:
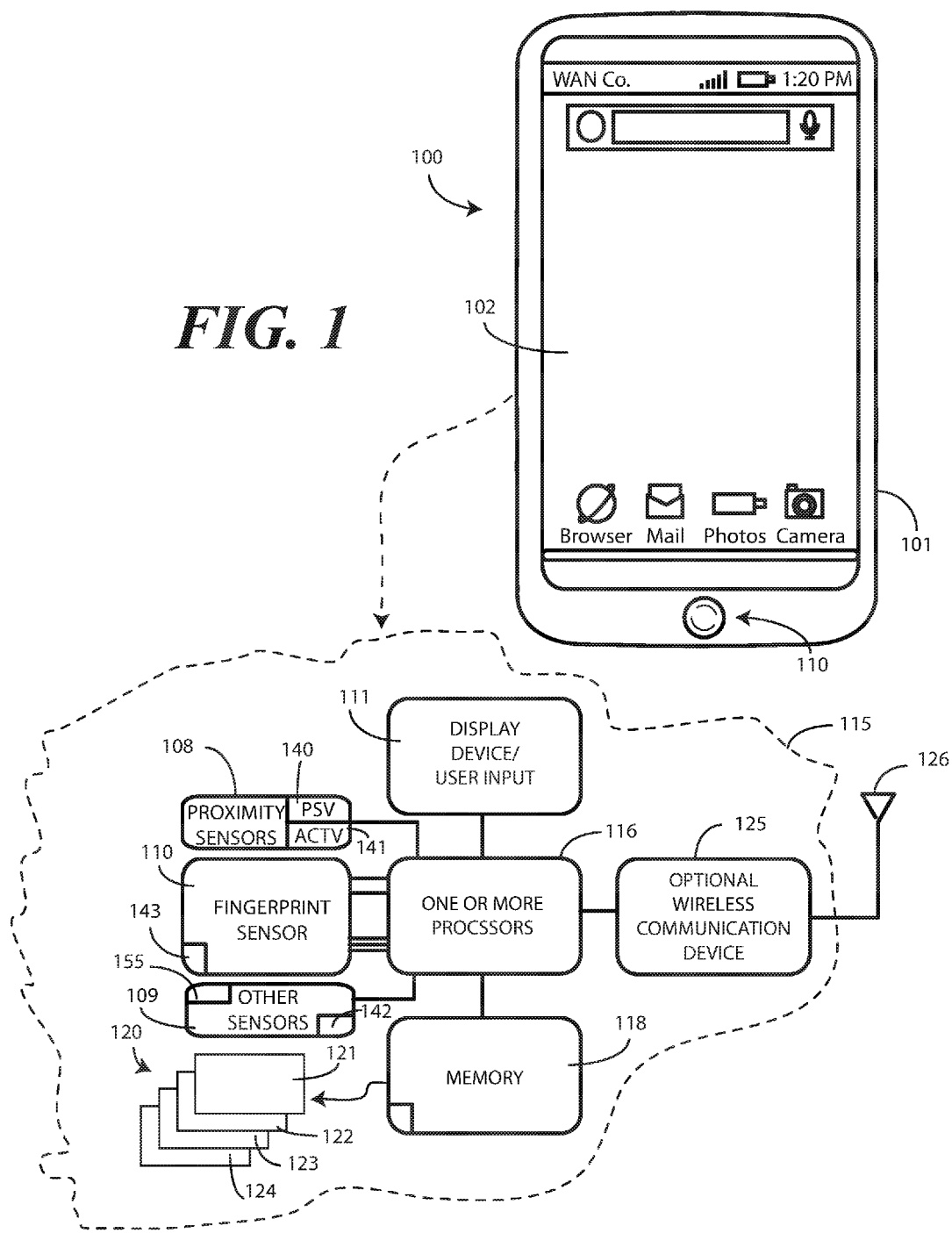
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using a fingerprint sensor with one or more pocket detecting sensor components to control modes of operation of an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling fingerprint sensors and/or pocket detecting sensor components to control device operation as described herein. The non-processor circuits may include, but are not limited to, a radio receiver, a radio transmitter, signal drivers, clock circuits, power source circuits, and other user input devices. As such, these functions may be interpreted as steps of a method to perform device control. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that modern fingerprint sensors can be sensitive enough to "trigger" or otherwise attempt to identify a fingerprint through clothing. Illustrating by example, if an electronic device is stowed within a pocket, a sensitive fingerprint sensor can be triggered by a user's leg. When this occurs, the fingerprint sensor will capture images or otherwise try to identify a fingerprint to authenticate a user. In normal operation, this will of course result in non-authentication, as a user's pocket lining disposed between the sensor and the user's leg does not resemble a fingerprint.

This non-authentication notwithstanding, embodiments of the disclosure contemplate that repeated authentication attempts when the electronic device is in an environment where no fingerprint authentication should occur can be problematic. Illustrating by example, many electronic devices have "lockout" features that lock out a user or worse, erase data on the device, when a predefined number of failed authentication attempts has been reached. Accordingly, a device with a fingerprint sensor that continually triggers in a pocket risks a comprehensive loss of data. While not all situations are this dire, more benign outcomes can be similarly deleterious. A fingerprint sensor that continually fires while an electronic device is stowed in a pocket consumes power. This results in reduced device run time and a diminished user experience.

Embodiments of the present disclosure advantageously provide a solution to these and other problems. In one or more embodiments, a fingerprint sensor system is configured with quality control functionality, automatic sensitivity adjustment capability, and in-pocket detection to ensure that a fingerprint sensor does not repeatedly attempt to authenticate an object that is not a finger. Illustrating by example, in one embodiment when an electronic device in accordance with one or more embodiments of the disclosure is stowed within a pocket, and a fingerprint sensor is turned away from the user's body, embodiments of the disclosure are operable to transition the fingerprint sensor to a low-power or sleep mode so that it will not attempt to authenticate any fingerprints until it is removed from the pocket. Accordingly, the fingerprint sensor will not inadvertently consume excessive amounts of power while the electronic device is stowed within the pocket.

Alternatively, when the fingerprint sensor is turned toward a user's body, but is not being actuated by a finger, embodiments of the disclosure adjust fingerprint sensor operating sensitivities to avoid authentication attempts when no finger is present. In one or more embodiments, one or more processors operable with the fingerprint sensor are operable to assign a quality score to fingerprint data obtained from the fingerprint sensor when the fingerprint sensors scans or otherwise attempts to authenticate a fingerprint. This quality score can be a function of one or more factors, including the number of fingerprint features (characteristics that generally match those of a fingerprint) found in a scan or image, the signal to noise ratio of the scan or image, the contrast of the scan or image, or other metrics. The one or more processors can then determine whether the quality score falls below a predefined threshold. Where it does, the one or more processors conclude that the object adjacent to the fingerprint sensor is not a finger. Accordingly, the fingerprint data is rejected and is not considered for authentication. In one or more embodiments, the one or more processors can increment a counter to track the number and/or frequency of these events.

In one embodiment, once one or more fingerprint capture events occur (the number will depend upon configuration), the one or more processors can take additional steps to ensure that excessive authentication attempts do not occur. In one or more embodiments, the one or more processors are operable to then adjust the sensitivity of the fingerprint sensor. For instance, in one embodiment the one or more processors can then adjust the sensitivity of the fingerprint sensor with each additional scan where the quality score falls below the predefined threshold.

In one embodiment, the one or more processors initially increase the sensitivity of the fingerprint sensor in an effort to drive the fingerprint sensor to a state of high enough sensitivity that an object, such as a finger, would be detected in essentially every instance where the object was proximately located with the fingerprint sensor. While sensitivity is being increased, the one or more processors may monitor for an interrupt indicating that whatever object is triggering the fingerprint sensor has moved sufficiently far away from the fingerprint sensor that it no longer is in close enough proximity to trigger the fingerprint sensor. Such an interrupt is known as a "lift" interrupt since it occurs when a user lifts their finger from the fingerprint sensor. When a lift interrupt is detected, in one or more embodiments the fingerprint sensor may then return to a normal mode of operation at its normal sensitivity.

However, if maximum sensitivity is reached prior to a lift interrupt, the one or more processors may then reduce the sensitivity of the fingerprint sensor to a level where the fingerprint sensor can no longer detect an object disposed adjacent to the surface of the fingerprint sensor. While this is occurring, if no quality score is obtained that exceeds the predefined threshold, the one or more processors can optionally transition the fingerprint sensor to a low-power or sleep mode to prevent continued false authentication occurrences.

In one or more embodiments, prior to doing so, one or more sensors operable with the one or more processors first determine whether the electronic device is disposed within a pocket. For instance, light sensors, proximity sensor components, imagers, or other sensors can determine whether the electronic device is covered with textile material. In one or more embodiments, the one or more processors transition the fingerprint sensor to a low power or sleep mode to prevent continued false authentication occurrences only when the electronic device is disposed within a pocket or is otherwise covered. The pocket and/or clothing detection can then operate in reverse, i.e., once the electronic device becomes uncovered or is removed from the pocket the one or more processors can return the fingerprint sensor to an active mode of operation.

The various steps set forth above can be used in different combinations to achieve different advantages. For example, when the one or more processors are adjusting the sensitivity of the fingerprint sensor and the other sensors determine that the electronic device is being removed from a pocket, the one or more processors can terminate the sensitivity adjustment process and return the sensitivity to a default level. This type of functionality advantageously allows the fingerprint sensor of the electronic device to remain as responsive as possible for use by a user, despite the fact that slightly more power may be required by the other sensors monitoring the pocket or clothing. Other method step combinations will be obvious to those of ordinary skill in the art having the benefit of this disclosure.

In one embodiment, a method in an electronic device comprises detecting, with a fingerprint sensor, false fingerprint data. As noted above, in one embodiment this includes assigning a quality score to fingerprint data obtained from the fingerprint sensor, and then determining whether the quality score falls below a predefined threshold. The detection of false fingerprint data can occur one, two, three, or another predefined amount of times before additional action is taken.

In one embodiment, after detecting the false fingerprint data one or a predetermined number of times, the method can include determining, with one or more sensors operable with one or more processors, whether the electronic device is disposed within a pocket. Where the electronic device is disposed within a pocket, the one or more processors can transition the fingerprint sensor from an active mode of operation to a low power or sleep mode.

As noted above, intervening steps can occur between detecting false fingerprint data and detecting being stowed in a pocket. For example, in one embodiment the one or more processors can adjust the operation of the fingerprint sensor. This adjustment can include increasing the sensitivity of the fingerprint sensor, decreasing the sensitivity of the fingerprint sensor, or combinations thereof. In one or more embodiments, one or more additional detections of false fingerprint data may be required after the operation of the fingerprint sensor has been adjusted prior to detecting in-pocket status and/or transitioning to the low power or sleep mode. Other configurations will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members, such as a front housing member disposed about the periphery of the display and a rear-housing member forming the backside of the electronic device 100. Features can be incorporated into the housing 101, including an optional camera or an optional speaker port.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, logic steps, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100. The application layer 124 can be responsible for executing application service modules. The application service modules may support one or more applications or "apps, such as a cellular telephone application for making voice telephone calls or a web browsing application to allow the user to view webpages on the display 102 of the electronic device 100. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, one or more proximity sensors 108 can be operable with the one or more processors 116. In one embodiment, the one or more proximity sensors 108 include one or more proximity sensor components 140. The proximity sensors 108 can also include one or more proximity detector components 141. In one embodiment, the proximity sensor components 140 comprise only signal receivers. By contrast, the proximity detector components 141 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat directly emanating from a person's body (as opposed to reflecting off the person's body) while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 140 comprises an infrared signal receiver so as to be able to detect infrared emissions from a person. Accordingly, the proximity sensor component 140 requires no transmitter since objects disposed external to the housing deliver emissions that are received by the infrared receiver. As no transmitter is required, each proximity sensor component 140 can operate at a very low power level. A group of infrared signal receivers can operate with a total current drain of just a few microamps (~10 microamps per sensor). By contrast, a proximity detector component 141, which includes a signal transmitter, may draw hundreds of microamps to a few milliamps.

In one embodiment, one or more proximity detector components 141 can each include a signal receiver and a corresponding signal transmitter. The signal transmitter can transmit a beam of infrared light that reflects from a nearby object and is received by a corresponding signal receiver. The proximity detector components 141 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the electronic device 100.

In one embodiment, the one or more processors 116 may generate commands or execute control operations based on information received from one or more proximity sensors 108. The one or more processors 116 may also generate commands or execute control operations based upon information received from a combination of the one or more proximity sensors 108 and one or more other sensors 109. Alternatively, the one or more processors 116 can generate commands or execute control operations based upon information received from the one or more other sensors 109 alone. Moreover, the one or more processors 116 may process the received information alone or in combination with other data, such as the information stored in the memory 118.

The one or more other sensors 109 may include a microphone. The one or more other sensors 109 may also include touch sensors, a touch pad sensor, a touch screen sensor, a capacitive touch sensor, and one or more switches. Touch sensors 155 may used to indicate whether any of the user actuation targets present on the display 102 are being actuated. Alternatively, touch sensors 155 disposed in the housing 101 can be used to determine whether the electronic device 100 is being touched at side edges or major faces of the electronic device 100 are being performed by a user. The touch sensors 155 can include surface and/or housing capacitive sensors in one embodiment. The other sensors 109 can also include video sensors (such as a camera).

The other sensors 109 can also include motion detectors 142, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Regardless of the type of motion detectors 142 that are used, in one embodiment the motion detectors 142 are also operable to detect one or more of movement, and direction of movement, of the electronic device 100 by a user. In one or more embodiments, the other sensors 109 and the motion detectors 142 can each be used to detect motion corresponding to a user's body or to human motion. This information can be used to determine that the electronic device 100 is proximately located with a user's body.

Illustrating by example, in one embodiment when the electronic device 100 is placed within a pocket of clothing that a user is wearing, the motion detectors 142 can be used to detect predefined motions corresponding to human motion. These predefined motions can be small, and can include vibration, shaking, breathing, micromotions, and so forth. For instance, if the user is walking, the motion detectors 142 can detect this movement. The one or more processors 116 can then extract parametric data from electronic signals delivered by these motion detectors 142 in response to the user walking. By comparing the parametric data to a reference file stored in memory 118, the one or more processors 116 can identify the walking motion as corresponding to the motion of the user's body. The one or more processors 116 can use this information to distinguish the electronic device 100 being in a user's pocket compared to, for example, being in a drawer.

Similarly, if the user is simply sitting in a chair, the motion detectors 142 can be used to detect body motions—even tiny ones—such as that of the user breathing By comparing the parametric data extracted from this motion to a reference file stored in memory 118, the one or more processors 116 can identify the fact that the movement that the electronic device 100 is experiencing is due to the fact that the electronic device 100 is proximately located with a user's torso, limbs, head, or appendages, or otherwise generally disposed along the user body instead of, for example, being placed on a table. Other user motion that can be readily detected by parametric data includes motion associated with driving, riding a bike, or simply shifting in their seat. In one or more embodiments, the one or more processors 116 can conclude from these motions that the electronic device 100 is disposed near or on a person's body. The motion detectors 142 can be used to detect other movement of the electronic device 100 as well. For example, in some embodiments a user can deliver gesture input by moving a hand or arm in predefined motions in close proximity to the electronic device 100.

Many of the sensors in the electronic device 100 can be used to detect movement, gestures, or other user input. For example, the one or more proximity sensors 108 can detect the gesture of a user waving a hand above the display 102. In another embodiment, the user can deliver gesture input by touching the display 102. In yet another embodiment, the accelerometer can detect gesture input from a user lifting, shaking, or otherwise deliberately moving the electronic device 100. In yet other embodiments, the user can deliver gesture input by rotating or changing the orientation of the electronic device 100, which can be detected by multiple accelerometers or a gyroscope.

In one or more embodiments, a fingerprint sensor 110 is operable with the one or more processors 116. In one embodiment, the fingerprint sensor 110 includes its own associated processor 143 to perform various functions, including detecting a finger touching the fingerprint sensor 110, capturing and storing fingerprint data from the finger, detecting user actions across a surface of the fingerprint sensor 110.

The processor 143 can perform at least one pre-processing step as well, such as assigning a quality score to fingerprint data obtained from the fingerprint sensor 110 when the fingerprint sensors 110 scans or otherwise attempts to detect an object such as a finger being proximately located with the fingerprint sensor 110. This quality score can be a function of one or more factors, including the number of fingerprint features found in a scan or image, the signal to noise ratio of the scan or image, the contrast of the scan or image, or other metrics. The one or more processors 116, or alternatively the processor 143 associated with the fingerprint sensor 110, can then perform additional pre-authentication steps as well, including determining whether the quality score falls below a predefined threshold. Where it does, the one or more processors 116 or the processor 143 associated with the fingerprint sensor 110 can conclude that any object adjacent to the fingerprint sensor 110 and being scanned by the fingerprint sensor 110 is likely not a finger. Accordingly, the one or more processors 116 or the processor 143 associated with the fingerprint sensor 110 can preclude the fingerprint data from consideration for authentication. In one or more embodiments, the one or more processors 116 or the processor 143 associated with the fingerprint sensor 110 can additionally increment a counter stored in memory 118 to track the number and/or frequency of these "low quality score" events.

Where the quality score is sufficiently high, the fingerprint sensor 110 or its associated processor 143 (where included) can deliver fingerprint data to the one or more processors 116. In one or more embodiments the processor 143 of the fingerprint sensor 110 can optionally perform one or more preliminary authentication steps where the quality score is sufficiently high, including comparing fingerprint data captured by the fingerprint sensor 110 to a reference file stored in memory 118. The processor 143 of the fingerprint sensor 110 can be an on-board processor. Alternatively, the processor 143 can be a secondary processor that is external to, but operable with, the fingerprint sensor in another embodiment. Other configurations will be obvious to those of ordinary skill in the art having the benefit of this disclosure.

In one embodiment, the fingerprint sensor 110 can include a plurality of sensors. The fingerprint sensor 110 can be a complementary metal-oxide-semiconductor active pixel sensor digital imager or any other fingerprint sensor. The fingerprint sensor 110 can be configured to capture, with the plurality of sensors, a live scan of a fingerprint pattern from a finger disposed along its surface, and to store this information as fingerprint data from the user's finger. The fingerprint sensor 110 may also be able to capture one or more images with the plurality of sensors. The images can correspond to an area beneath a surface of skin. The fingerprint sensor 110 can compare the fingerprint data or skin images to one or more references to authenticate a user in an authentication process.

In one or more embodiments, the fingerprint sensor 110 can be placed into a low power or sleep mode in certain circumstances. For example, when the other sensors 109 detect that the electronic device 100 is disposed within a pocket, and false fingerprint data has been detected one or more times, the one or more processors 116 can transition the fingerprint sensor 110 to a low power or sleep mode to save power. Various methods for performing this transition will be explained in more detail below with reference to FIGS. 8-9.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
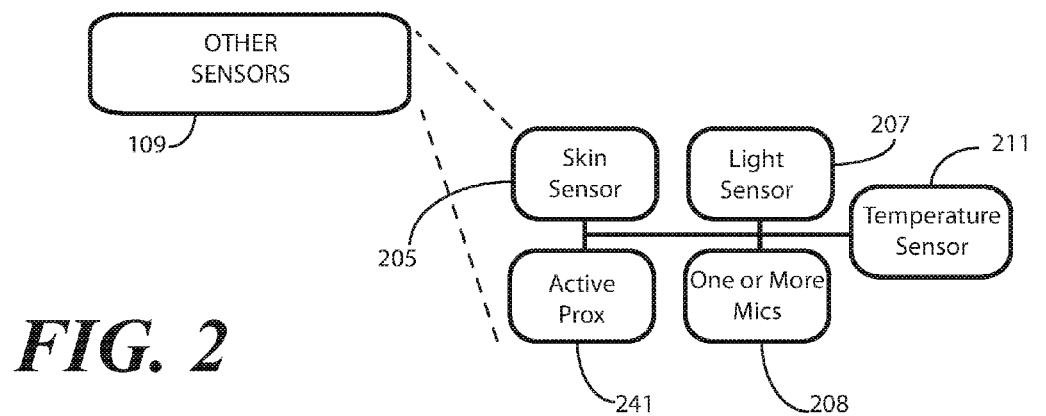
FIG. 2 illustrates examples of sensors that can be included in an electronic device configured in accordance with one or more embodiments of the disclosure.

It should be clear to those of ordinary skill in the art having the benefit of this disclosure that additional sensors can be included with the other sensors 109 shown in FIG. 1. Turning briefly to FIG. 2, illustrated therein are some additional sensors that can be operable with the one or more processors (116) as well. General examples of these sensors include time sensors, date sensors, environmental sensors, weather sensors, ultrasonic sensors, location sensors, and so forth.

In one embodiment, a skin sensor 205 is configured to determine when the electronic device (100) is proximately located with the skin of a wearer. For example, when the electronic device (100) is being held within the hand of a user, this can be detected by the skin sensor. A light sensor 207 can be used to detect whether or not direct light is incident on the housing (101) of the electronic device (100). A proximity detector component 141 can emit infrared signals to determine when the electronic device (100) is covered by an object such as clothing. One or more microphones can be configured to detect an audio signature corresponding to a clothing object covering the housing (101) of the electronic device (100). Other sensors, subsets of these sensors, and so forth can be used in accordance with the methods described herein. As noted above, in one embodiment the touch sensor (155) can be placed along the edge of the housing 101 of the electronic device 100 to detect when the electronic device 100 is grabbed by a hand and/or fingers.

These other sensors 109 can be used to confirm the electronic device (100) is disposed within a pocket in one or more embodiments. Said differently, when the one or more processors (116) determine that the motion of the electronic device (100) is defined by parametric data that corresponds to movement of a user's body, and there is no touch input being delivered to the touch sensor (155), and there is approximately the same temperature at two different locations on the electronic device (100), and the one or more processors (116) conclude that the electronic device (100) is disposed within a pocket, one or more of these other sensors 109 can be used to confirm this conclusion in one or more embodiments. For example, the light sensor 207 may detect that direct light is not incident along the housing (101), thereby confirming that the electronic device (100) is covered. The microphone 208 may detect the sound of clothing as the electronic device (100) slides into the pocket. The skin sensor 205 may detect that no skin is touching the housing (101). The proximity detector component 241 may determine that the electronic device (100) is covered. The temperature sensor 211 can be used to determine temperatures of the ends of the electronic device (100) instead of proximity sensor components (140). These each can provide a confirmation of the in-pocket condition, and can be used alone or in combination with other factors.

Figure 3:
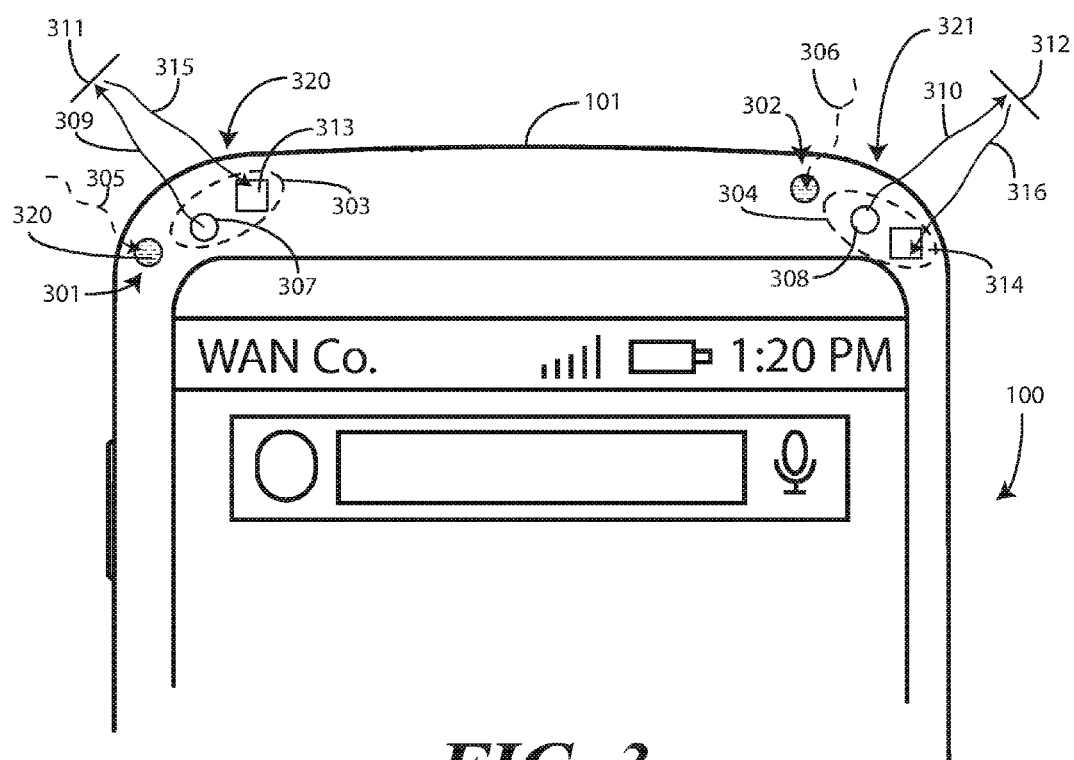
FIG. 3 illustrates explanatory proximity sensor component and proximity detector component configurations in accordance with one or more embodiments of the disclosure.

Turning now to FIG. 3, illustrated therein is the difference between proximity sensor components 301,302 and proximity detector components 303,304 as those terms are used herein. Illustrated therein are two proximity sensor components 301,302 and two proximity detector components 303, 304, each disposed at different locations 320,321, each of which happens to be a corner of the electronic device 100 in this illustrative embodiment. In this embodiment, each proximity sensor component 301,302 comprises a signal receiver 313 only, such as an infrared photodiode to detect an infrared emission 305,306 from an object external to the housing 101 of the electronic device 100. No corresponding transmitter is included or required for the proximity sensor component 301,302 to function. As no active transmitter emitting signals is included, each proximity sensor component 301,302 is sometimes referred to as a "passive IR" proximity sensor. As the proximity sensor components 301, 302 receive thermal emissions from an object, in one or more embodiments they can be used as temperature sensors.

By contrast, each proximity detector component 303,304 can be an infrared proximity sensor set that uses a signal emitter 307,308 that transmits a beam 309,310 of infrared light that reflects 311,312 from a nearby object and is received by a corresponding signal receiver 313,314. Proximity detector components 303,304 can be used, for example, to compute the distance to any nearby object from characteristics associated with the reflected signals 315,316. The reflected signals 315,316 are detected by the corresponding signal receiver 313,314, which may be an infrared photodiode used to detect reflected light emitting diode (LED) light, respond to modulated infrared signals, and/or perform triangulation of received infrared signals. Accordingly, the proximity detector components 303,304 can be used to determine of the electronic device 100 is covered by clothing in one or more embodiments.

In one embodiment, the proximity sensor components 301,302 and the proximity detector components 303,304 can include at least two sets of components. For example, a first set of components can be disposed at a location 320 on the electronic device 100, while another set of components can be disposed at a second location 321 on the electronic device 100.

Now that the various hardware components have been described, attention will be turned to methods and use cases in accordance with one or more embodiments of the disclosure.

Figure 4:
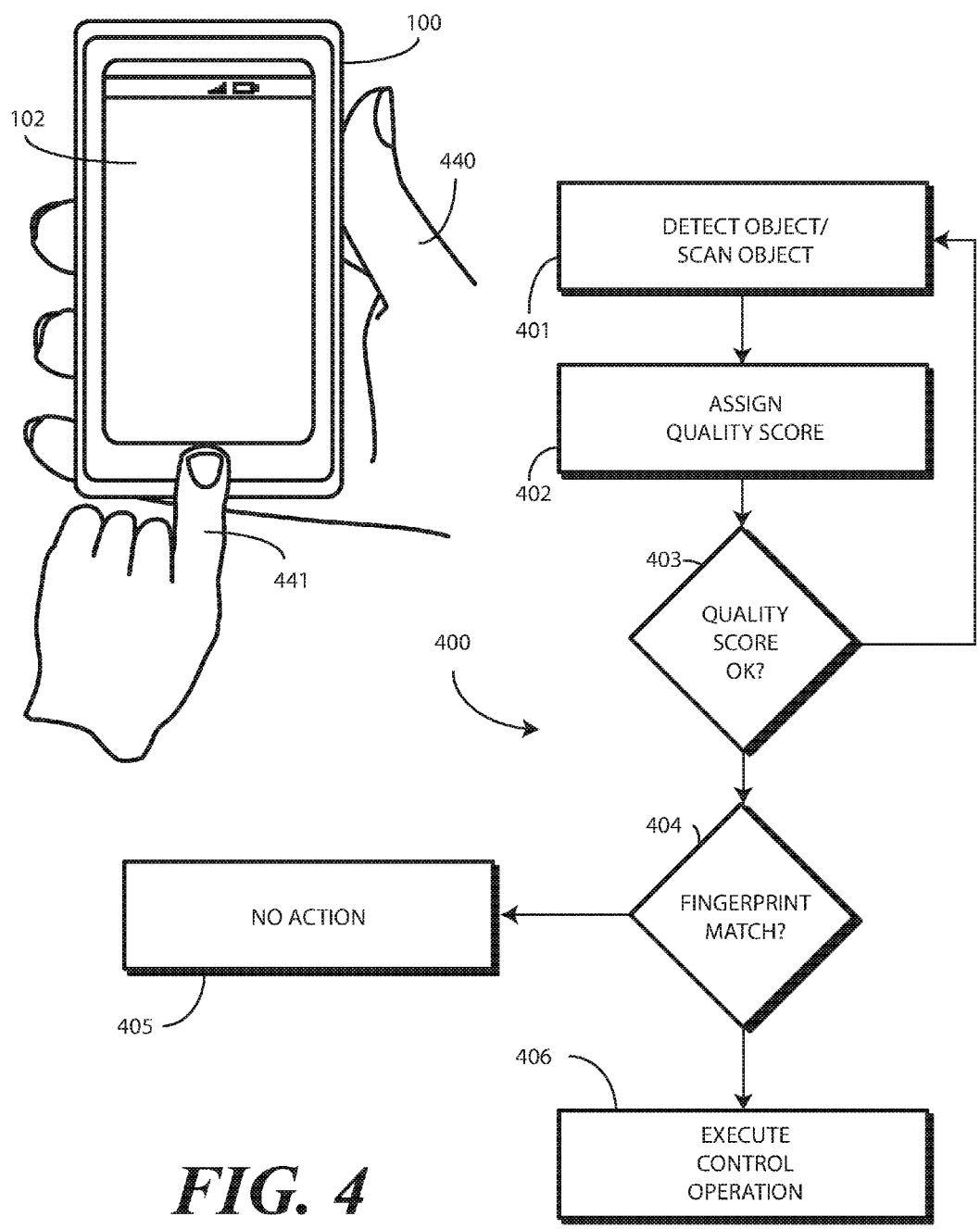
FIG. 4 illustrates an explanatory method for an electronic device in accordance with one or more embodiments of the disclosure.

Turning now to FIG. 4, illustrated therein is one method 400 for an electronic device 100 in accordance with eon or more embodiments of the disclosure. As shown in FIG. 4, a user 440 is interacting with the fingerprint sensor (110) of the electronic device 100 by placing their finger 441 against the surface of the fingerprint sensor (110). As shown at step 401, the one or more processors (116) or the processor (143) associated with the fingerprint sensor (110), where included, are the operable to capture, with the plurality of sensors, a live scan of a fingerprint pattern from a finger 441 disposed along its surface. At step 401, the one or more processors (116) or the processor (143) associated with the fingerprint sensor (110) can also be operable to store this information as fingerprint data from the user's finger in the memory (118). At step 401, the fingerprint sensor (110) may also be able to capture one or more images of the finger 441. The images can correspond to an area beneath a surface of skin.

At step 402, the one or more processors (116) or the processor (143) associated with the fingerprint sensor (110) can then assign a quality score to fingerprint data obtained from the fingerprint sensor (110) at step 401. The quality score assigned at step 402 can be a function of one or more factors, including the number of fingerprint features from the finger 441 found in a scan or image, the signal to noise ratio of the scan or image, or the contrast of the scan or image. Other quality metrics will be obvious to those of ordinary skill in the art having the benefit of this disclosure.

At decision 403, in one embodiment the one or more processors (116) or the processor (143) associated with the fingerprint sensor (110) can determine whether the quality score assigned at step 402 falls below a predefined threshold. The predefined threshold will vary based upon application. For example, a quality score assigned at step 402 may be on a scale from zero to 100, with 100 being a highest quality scan and zero being a lowest quality scan. Based upon experimental testing and other evaluation, it may be determined that authentication should occur whenever the quality score is above, for example, 75. Where this is not the case, the one or more processors (116) or the processor (143) associated with the fingerprint sensor (110) can conclude that any object adjacent to the fingerprint sensor (110) is likely not a finger. Accordingly, the one or more processors (116) or the processor (143) associated with the fingerprint sensor (110) can preclude the fingerprint data from consideration for authentication by returning the method 400 to step 401. The one or more processors (116) or the processor (143) associated with the fingerprint sensor (110) can optionally also increment a counter stored in memory (118) to track the number and/or frequency of low quality score events.

Where the quality score assigned at step 402 is above the predefined threshold, as determined at decision 403, the one or more processors (116) or the processor (143) associated with the fingerprint sensor (110) can then attempt to authenticate the fingerprint data at decision 404. Said differently, where the quality score assigned at step 402 is sufficiently high, as determined at decision 403, the one or more processors (116) or the processor (143) associated with the fingerprint sensor (110) can compare, at decision 403, the fingerprint data captured at step 401 to a reference file stored in memory 118.

Where there is a sufficient match, at step 406 the one or more processors (116) or the processor (143) associated with the fingerprint sensor (110) can perform a control operation. Examples of control operations include actuating the display 102, actuating apps, making stored data available to the user 440, and so forth. Other control operations will be obvious to those of ordinary skill in the art having the benefit of this disclosure. Where there is not a sufficient match, the one or more processors (116) or the processor (143) associated with the fingerprint sensor (110) can take no action at step 405.

Figure 5:
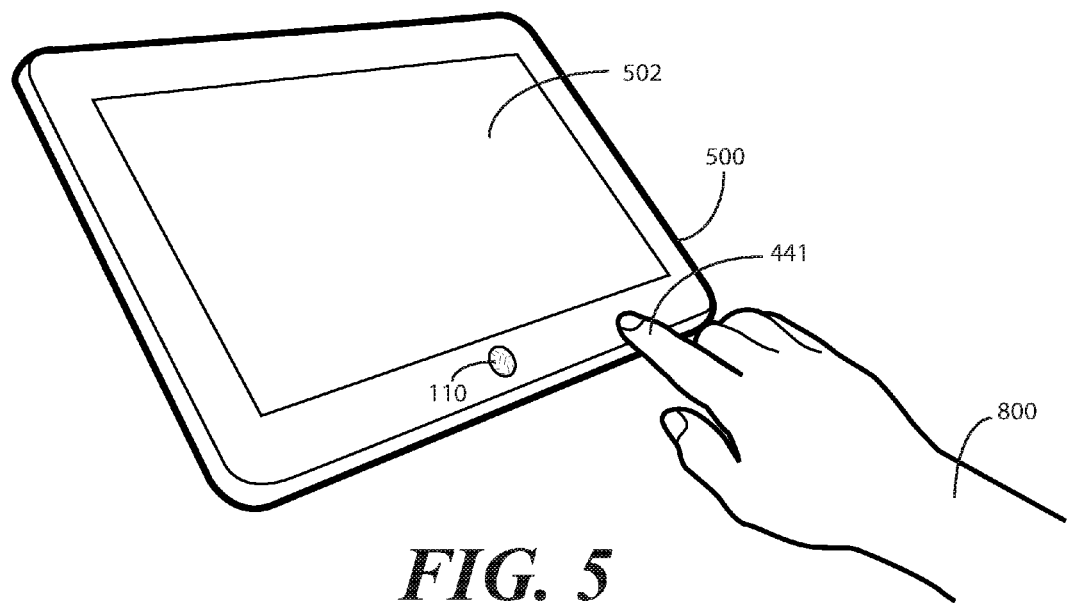
FIGS. 5-6 illustrate a fingerprint sensor operating in a normal mode of operation in accordance with one or more embodiments of the disclosure.
Figure 6:
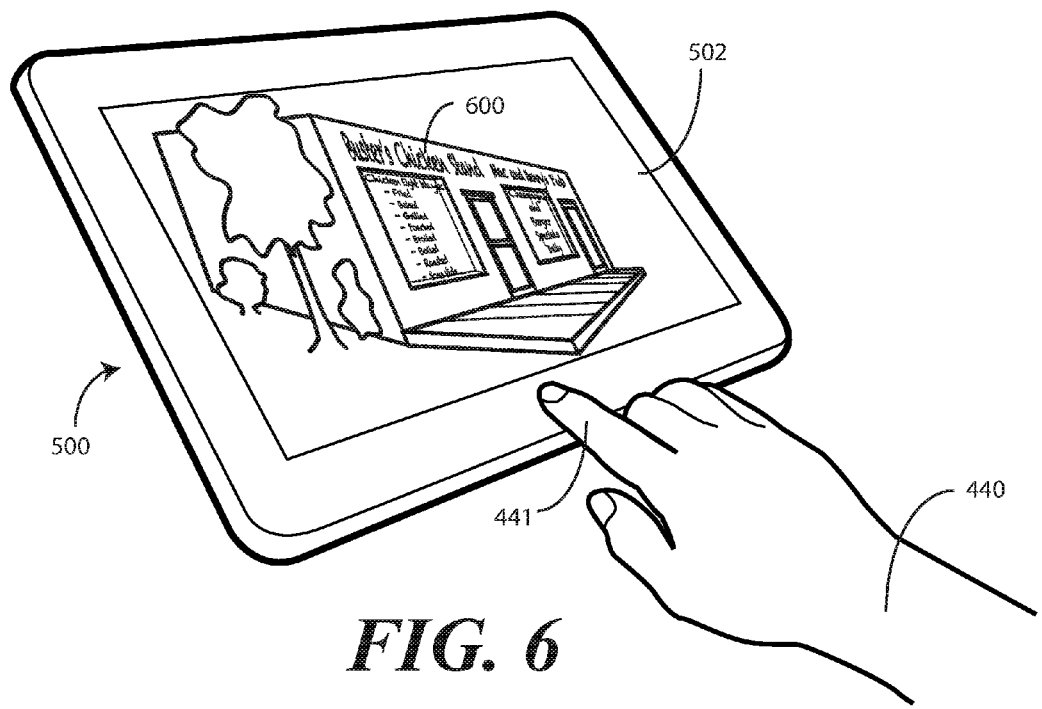

Turning now to FIGS. 5-6, the method (400) of FIG. 4 is illustrated graphically. Beginning with FIG. 5, an electronic device 500 having a fingerprint sensor 110 is in a locked state. This locked state can include the electronic device 500 being in a low power or sleep mode. The locked state can occur, for example, when a user does not interact with the electronic device 500 for a predefined period of time. When in this mode, the display 502 is blank. As shown in FIG. 5, a user 440 is approaching the fingerprint sensor 110 with a finger 441.

Turning to FIG. 6, the user 440 places the finger 441 against the fingerprint sensor (110). Accordingly, the fingerprint sensor (110) captures and stores fingerprint data from the finger 441 as described above with reference to step (401) of FIG. 4. One or more processors operable with the fingerprint sensor (110) then perform the remaining steps of FIG. 4. One of several options can occur: First, authentication can be successful (step 406 of FIG. 4). Where this is the case, the fingerprint sensor (110) can unlock the electronic device 500. Alternatively, authentication can be unsuccessful (step 405 of FIG. 4). Where this is the case, the fingerprint sensor (110) can leave the electronic device 500 in the locked state until another object contacts the fingerprint sensor (110). In a third case, the user 440 may be unidentified due to an error with the fingerprint sensor (110). However, to allow the user 440 to use the electronic device 500, one or more processors may allow the user 440 can authenticate themselves by other techniques, such as by entering a personal identification number.

In the illustrative embodiment of FIG. 6, the authentication in this example has been successful. As such, the electronic device transitions to an active mode and the display 502 becomes active. Here, the user 440 is thus able to look at a picture 600 of a new restaurant they want to try, Buster's Chicken Shack.

Figure 7:
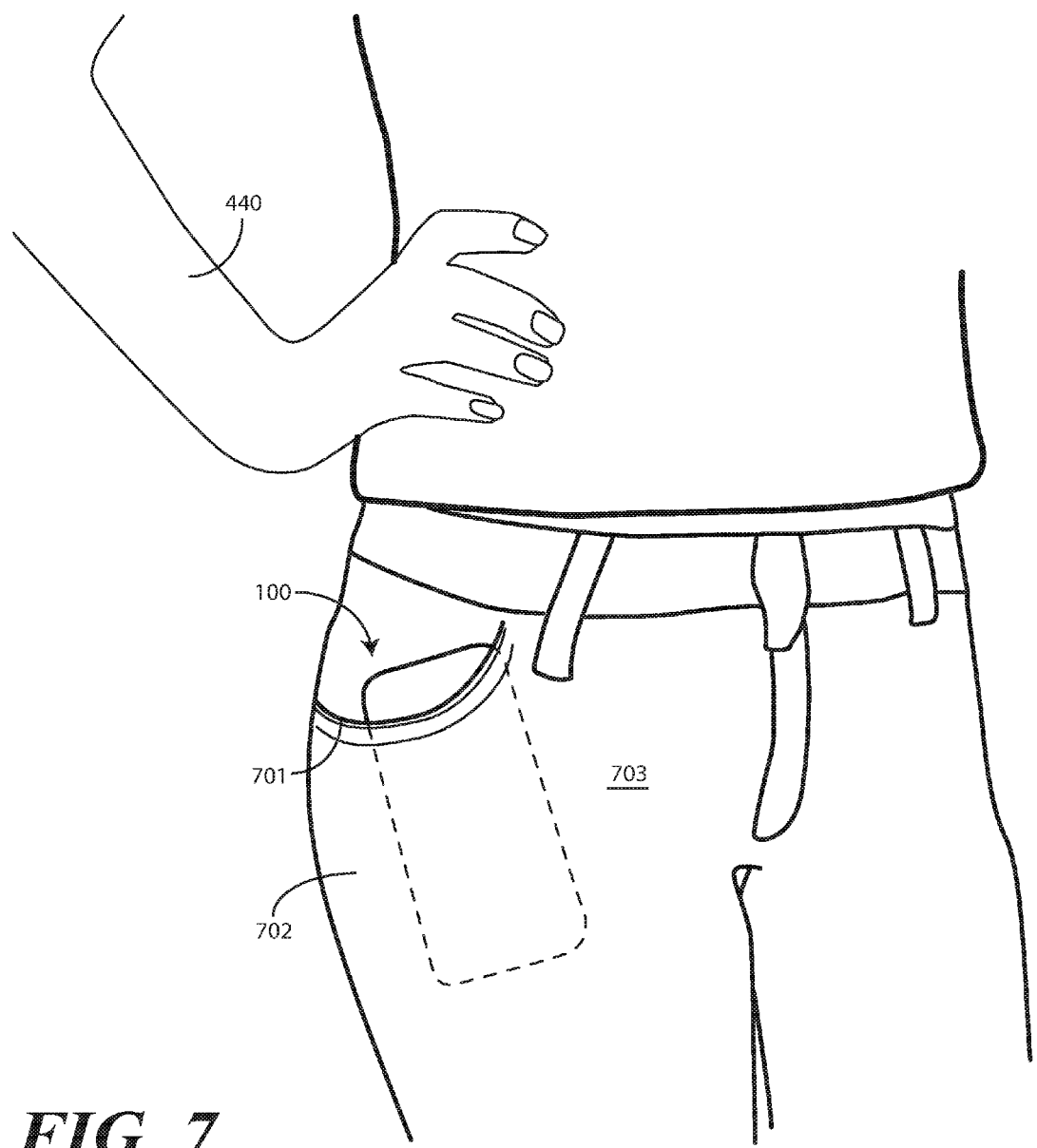
FIG. 7 illustrates an explanatory electronic device in accordance with one or more embodiments of the disclosure stowed within a pocket.

Turning now to FIG. 7, an electronic device 100 in accordance with one or more embodiments of the disclosure is disposed within the pocket 701 of a user 440. As noted above, with prior art devices this can be problematic. Modern fingerprint sensors are sensitive devices, and may in fact be triggered by the user's leg 702 through the user's pants 703. When this occurs, the prior art fingerprint sensor may capture images or otherwise try to identify a fingerprint to authenticate a user. Electronic devices having lockout features may then take action resulting in a comprehensive loss of data. In other situations, a fingerprint sensor stowed in the pocket 701 may consume power by continually firing, resulting in reduced device run time and a diminished user experience.

However, the electronic device 100 of FIG. 7 is configured in accordance with one or more embodiments of the disclosure. Accordingly, the electronic device 100 advantageously provides solutions to these and other problems. In one or more embodiments, the fingerprint sensor (110) system is configured with quality control functionality, automatic sensitivity adjustment capability, and in-pocket detection to ensure that a fingerprint sensor does not repeatedly attempt to authenticate an object that is not a finger.

Figure 8:
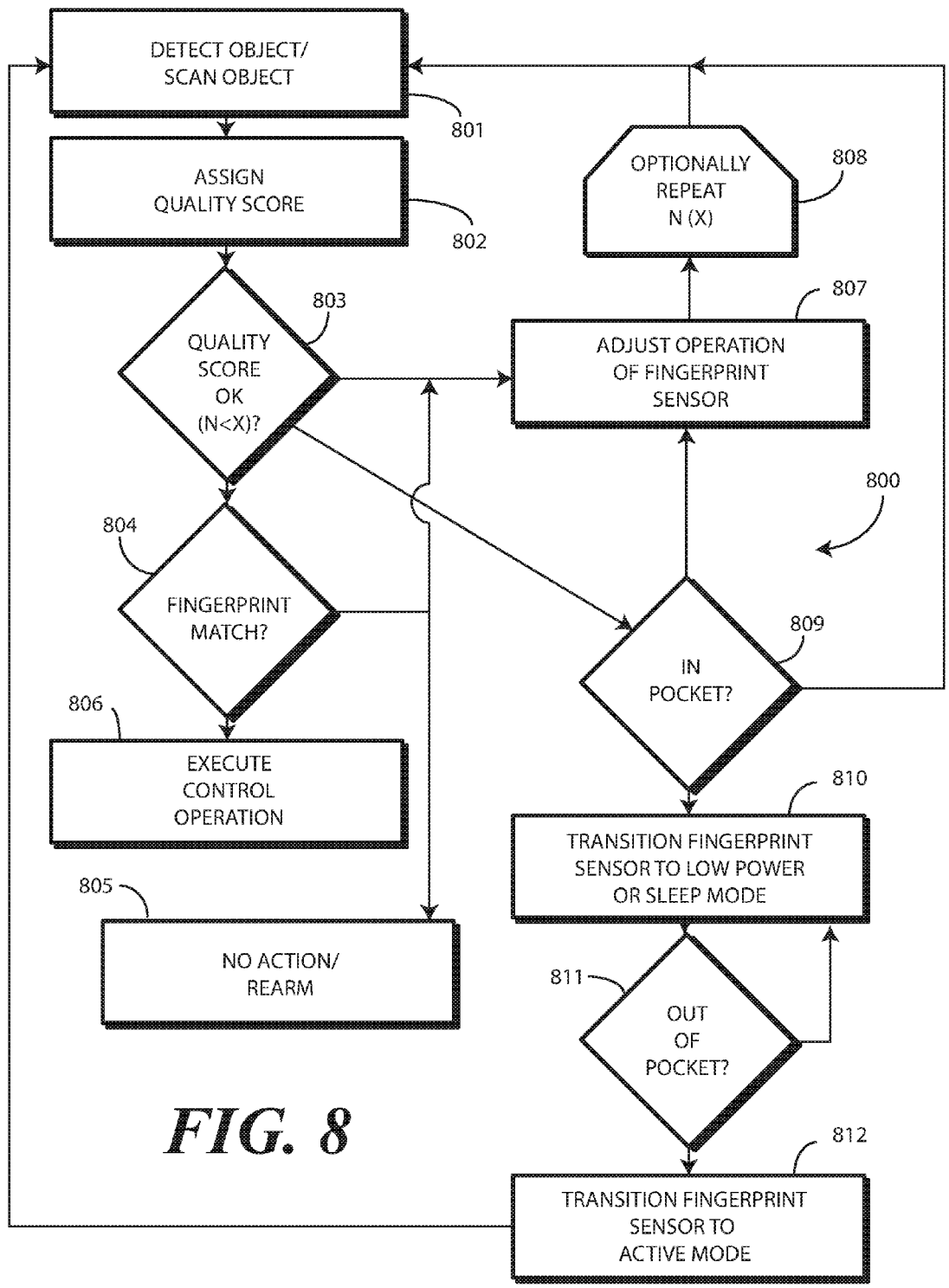
FIG. 8 illustrates another explanatory method for an electronic device in accordance with one or more embodiments of the disclosure.

Turning now to FIG. 8, illustrated therein is one explanatory method 800 by which these advantages can be obtained. Beginning with step 801, a fingerprint sensor (110) detects an object proximately located with, or adjacent to, its surface. At step 801, the method 800 scans or captures, with the plurality of sensors of the fingerprint sensor (110), an image or a scan of the object that is proximately located with, or adjacent to, the surface. At step 801, data associated with this scan or image can be stored in a memory (118).

In one or more embodiments, step 801 includes one or more substeps. For example, in one embodiment step 801 comprises three different substeps. In a first substep, the fingerprint sensor (110) waits for an object proximately located with its surface to be removed. In a second substep, the fingerprint sensor (110) then waits for an object to touch, or otherwise become proximately located with its surface. In a third substep, the fingerprint sensor (110) scans or captures, with the plurality of sensors of the fingerprint sensor (110), an image or scan of the object. Additional substeps can be added depending upon application. Additionally, some substeps can be omitted. The substeps can be performed in different orders. Other substeps will be obvious to those of ordinary skill in the art having the benefit of this disclosure.

Where step 801 includes one or more substeps, power savings can be achieved. For example, once an object is removed from the fingerprint sensor (110) in the first substep, the sensors or other components of the fingerprint sensor (110) may transition to a low power or sleep mode until an interrupt is received indicating that an object is now touching the fingerprint sensor (110), i.e., that the second substep has occurred. In other embodiments, the sensors or other components may transition to a low power mode and periodically transition to an active mode to detect the second substep occurring, for example. When such actions are carried out in this fashion, the inclusion of substeps at step 801 allows for a responsive fingerprint sensors that draws far less current than in prior art designs.

If the object is in fact a finger, this data is therefore fingerprint data. However, if the object proximately located with or adjacent to the fingerprint sensor (110) is not a finger, the data is referred to as "false" fingerprint data. In one or more embodiments, multiple images or scans can be captured at step 801. As noted above, the images or scans can correspond to a surface of the object. Alternatively, they may be images or scans of areas beneath the surface of the object.

At step 802, the method 800 assigns a quality score to data. In one or more embodiments, the quality score is assigned to the data regardless of whether the object proximately located with or adjacent to the fingerprint sensor (110) is a finger. In one or more embodiments, the quality score can be used to determine whether the data is fingerprint data or false fingerprint data. For example, the quality score assigned at step 802 can be a function of one or more factors, including whether a predefined number of fingerprint features appear in the data of the scan or image. Accordingly, where the fingerprint features are not found, the data may be considered to be false fingerprint data. However, where the predefined number of fingerprint features is found, the data can be considered to be fingerprint data. Other factors can be used in the quality score as noted above, including but not limited to the signal to noise ratio of the scan or image, or the contrast of the scan or image. Other quality metrics will be obvious to those of ordinary skill in the art having the benefit of this disclosure.

At decision 803, the method 800 determines whether the quality score assigned at step 802 falls below a predefined threshold. It should be noted that steps 801,802,803 can be repeated a predetermined number of times prior to proceeding to decision 804 or step 807. Accordingly, in one embodiment steps 801,802,803 can repeat one or more predetermined number of times.

Where the quality score assigned at step 802 is above the predefined threshold, as determined at decision 803, the method 800 attempts to authenticate the fingerprint data at decision 804. Where there is a sufficient match, at step 806 the method 800 executes a control operation. Where there is not a sufficient match, the method 800 can perform one of several actions. In one embodiment, the method 800 can take no action at step 805. Said differently, where the data detected at step 801 is false fingerprint data, in one or more embodiments the method 800 takes no action at step 805. In another embodiment where there is not a sufficient match, the method 800 can rearm the fingerprint sensor (110) at step 805. In yet another embodiment where there is not a sufficient match, the method 800 could tread this failed authentication in the same manner as that which occurs when the quality score assigned at step 802 falls below the predefined threshold, i.e., moving to step 807, as described below.

To this point, the method 800 of FIG. 8 is similar to the method (400) of FIG. 4. However, as noted above, embodiments of the present disclosure advantageously provide a solution that prevents the fingerprint sensor (110) from continually firing, i.e., capturing scans or images, when no finger is adjacent to the fingerprint sensor (110) or when the fingerprint sensor (110) is in a pocket. In one or more embodiments, a fingerprint sensor system is configured with quality control functionality, automatic sensitivity adjustment capability, and in-pocket detection to ensure that a fingerprint sensor does not repeatedly attempt to authenticate an object that is not a finger. The remaining steps of FIG. 8 and FIG. 9 describe one embodiment of this functionality.

Figure 9:
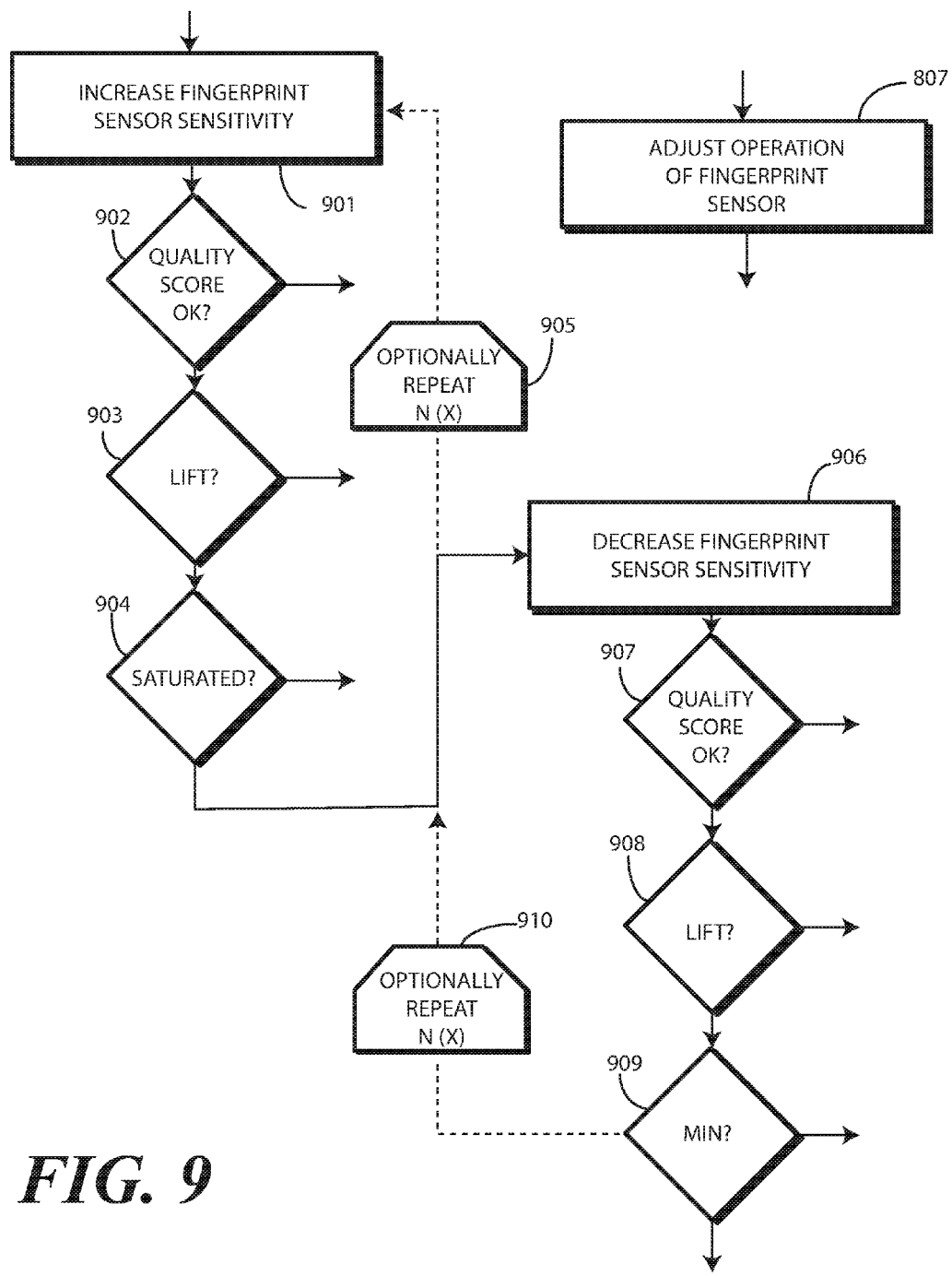
FIG. 9 illustrates one or more explanatory method steps for an electronic device in accordance with one or more embodiments of the disclosure.

In one or more embodiments, after detecting false fingerprint data a first time at step 801, the method 800 checks a predefined additional number of times in an effort to determine whether the object proximately located with or adjacent to the fingerprint sensor (110) is a finger. In one or more embodiments, to make this "recheck" more efficient, the method adjusts the operation of the fingerprint sensor (110) at step 807. This adjustment can occur in different ways. Turning briefly to FIG. 9, illustrated therein is one example of how the adjustment can occur.

In one or more embodiments, the adjustment of operation occurring at step 807 can comprise increasing a sensitivity of the fingerprint sensor (110). In another embodiment, the adjustment of operation occurring at step 807 can comprise decreasing the sensitivity of the fingerprint sensor (110). Of course, combinations of the two can be performed as well. For example, in one embodiment the adjustment of operation occurring at step 807 can comprise initially increasing the sensitivity of the fingerprint sensor (110) and then decreasing the sensitivity of the fingerprint sensor (110) after increasing the sensitivity of the fingerprint sensor (110). It will be obvious to those of ordinary skill in the art having the benefit of this disclosure that these steps can be executed out of order from that shown or discussed, including substantially concurrently or in reverse order, depending on the functionality involved.

At step 901, in one embodiment, the adjustment of operation occurring at step 807 can include increasing the sensitivity of the fingerprint sensor (110). After an increase in sensitivity, the fingerprint sensor (110) can rescan or reimage the object. Optional rechecks of the quality score can occur as indicated at decision 902. Said differently, at decision 902 the process can determine whether any additional fingerprint data is false. Where the quality score is above the predefined threshold, the process can return to decision (804) of FIG. 8.

In one or more embodiments, as shown at decision 903, the fingerprint sensor (110) can determine if the object has been removed from the surface of the fingerprint sensor (110). Where it has, the process can return to step (801) of FIG. 8, with the fingerprint sensor's sensitivity reset to the default value. Accordingly, in one or more embodiments the process of increasing the sensitivity of the fingerprint sensor (110) at step 901 occurs while the object, detected at step (801) of FIG. 8, is touching the fingerprint sensor (110). In one or more embodiments, the process of increasing the sensitivity of the fingerprint sensor (110) comprises continuing to adjust the sensitivity until either the object proximately located with the fingerprint sensor (110) is removed from the fingerprint sensor (110), as determined at decision

903, fingerprint data is obtained, as determined at decision 902, or maximum sensitivity is reached as determined at decision 904.

At decision 904, the process can check to see if a maximum sensitivity of the fingerprint sensor (110) has been reached. Assuming it has not, the process can repeat as shown at 905 with another incremental increase and sensitivity, another scan, optional other checks, and so forth. This loop can continue until the sensitivity saturates at the maximum as determined at decision 904.

Once maximum sensitivity is reached, in one embodiment the process moves to step 906. At step 906, in one embodiment the adjustment of operation occurring at step 807 comprises decreasing the sensitivity of the fingerprint sensor (110). After a decrease in sensitivity, the fingerprint sensor (110) can rescan or reimage the object. Optional rechecks of the quality score can occur as indicated at decision 907. Where the quality score is above the predefined threshold, the process can return to decision (804) of FIG. 8.

In one or more embodiments, as shown at decision 908, the fingerprint sensor (110) can determine if the object has been removed from the surface of the fingerprint sensor (110). Where it has, the process can return to step (801) of FIG. 8, with the fingerprint sensor's sensitivity reset to the default value. Accordingly, in one or more embodiments the process of increasing the sensitivity of the fingerprint sensor at step 906 occurs while the object, detected at step (801) of FIG. 8, is touching the fingerprint sensor (110). In one or more embodiments, the process of decreasing the sensitivity of the fingerprint sensor (110) comprises continuing to adjust the sensitivity until either the object proximately located with the fingerprint sensor (110) is removed from the fingerprint sensor (110), as determined at decision 908, fingerprint data is obtained, as determined at decision 907, or maximum sensitivity is reached as determined at decision 909.

At decision 909, the process can check to see if a minimum sensitivity of the fingerprint sensor (110) has been reached. Assuming it has not, the process can repeat as shown at 910 with another incremental decrease and sensitivity, another scan, optional other checks, and so forth. Where minimum sensitivity has been reached and no fingerprint data has been detected through increases and decreases in sensitivity, in whichever order they may occur, the process returns to the method of FIG. 8.

Turning now back to FIG. 8, to this point first false fingerprint data was detected at step 801, which led to the method 800 proceeding to step 807. It should be noted that this loop can repeat, as shown at 808, for a predetermined number of times by design. For example, if the loop iteration number of 808 is three, before proceeding to decision 809, step 801 may detect first false fingerprint data, second false fingerprint data, and third false fingerprint data. Other iteration numbers can be selected based upon application.

Once false fingerprint data is detected at step 801 for the last iteration defined by 808, in one or more embodiments the method 800 moves to decision 809 where the method determines, with one or more other sensors (109) whether the electronic device (100) is disposed within a pocket (701) or is otherwise covered by clothing. Methods for making this determination will be described below with reference to FIGS. 10-17. However, in one or more embodiments where the electronic device (100) is disposed within a pocket (701) or is covered by clothing, at step 810 the method 800 transitions the fingerprint sensor (110) to a low power or sleep mode. Advantageously, when the electronic device (100) is stowed within a pocket (701), step 810 transitions the fingerprint sensor (110) to a low power or sleep mode so that it will not attempt to authenticate any fingerprints until it is removed from the pocket, as determined at decision 811. Accordingly, the fingerprint sensor (110) will not inadvertently consume excessive amounts of power while the electronic device (100) is stowed within the pocket (701).

Thus, as shown in FIGS. 8-9, the method 800 will, in one embodiment, upon detecting at least first false fingerprint data, second false fingerprint data, or another number of false fingerprint data, scale the fingerprint sensor's sensitivity with each additional scan that yields data having a quality score falling below the predefined threshold. In one embodiment, at first the method 800 increases the sensitivity in an attempt to put the fingerprint sensor 110 in a state where it would always detect a finger proximately disposed with or adjacent to the fingerprint sensor (110). In one or more embodiments, the method 800 continues adjusting the sensitivity of the fingerprint sensor (110) until fingerprint data is obtained, maximum or minimum sensitivity is reached, or where a lift interrupt occurs indicating any object proximately located with or adjacent to the fingerprint sensor (110) has moved sufficiently far away that it no longer is in close proximity to the fingerprint sensor (110). If the lift interrupt occurs, in one embodiment the fingerprint sensor (110) stops the sensitivity adjustment, remaining at the sensitivity occurring just prior to the lift interrupt occurring so as to prevent the detection of any new false fingerprints.

In one or more embodiments, if maximum sensitivity is reached, adjustments are made to reduce the sensitivity of the fingerprint sensor (110) to the point that it can no longer detect the object. If this adjustment process fails to find a sensitivity that prevents the fingerprint sensor (110) from being actuated before reaching a minimum sensitivity level, the system determines whether the electronic device (100) is disposed within a pocket (701) or is otherwise covered with clothing. Where it is, one or more processors (116) of the electronic device (100) transition the fingerprint sensor (110) to a low power or sleep mode. Once the electronic device (100) is removed from the pocket (701), the fingerprint sensor (110) is returned to an active mode of operation.

It should be noted that the steps and decisions of FIGS. 8 and 9 can occur in different orders. For example, if the sensitivity of the fingerprint sensor (110) is being adjusted in accordance with FIG. 9, the detection of decision 809 can simultaneously occur so that, if the electronic device (100) is disposed within a pocket or is otherwise covered with clothing, the adjustment process can terminate to conserve power. Other combinations or arrangements of the various steps and decisions will be obvious to those of ordinary skill in the art having the benefit of this disclosure.

Decision 809 of FIG. 8 determines whether the electronic device (100) is disposed within a pocket (701). Advantageously, embodiments of the disclosure can detect this condition simply, quickly, and accurately. In one embodiment, using a motion detector (142), a touch sensor (155), and a temperature sensor (211), or alternatively one or more proximity sensor components (140), one or more processors (116) of the electronic device (100) detect one or more conditions to determine that the electronic device 100 is disposed within the pocket 701. Illustrative methods for doing so will now be described with reference to FIGS. 10-17 below. Other methods will be obvious to those of ordinary skill in the art having the benefit of this disclosure.

Illustrating by example, in one embodiment the one or more other sensors (109) can determine whether the electronic device (100) is disposed within a pocket (701) from parametric data. For instance, the one or more processors (116) can determine motion of the electronic device (100) from the motion detector (142) and can extract parametric data to confirm that this motion corresponds to human movement or motion of a human's body. The temperature sensor (211), or alternatively the one or more proximity sensor components (140), can determine whether a temperature disposed at a first location and a second location is an approximately common temperature. The touch sensor (155) can detect an absence of finger touch along a housing (101) of the electronic device. The one or more processors (116) can then confirm that the electronic device (100) is disposed within the pocket (701), in one embodiment, when the movement includes parametric data corresponding to human movement, the absence of finger touch is confirmed, and the temperature at both the first end and the second end is an approximately common temperature.

Figure 10:
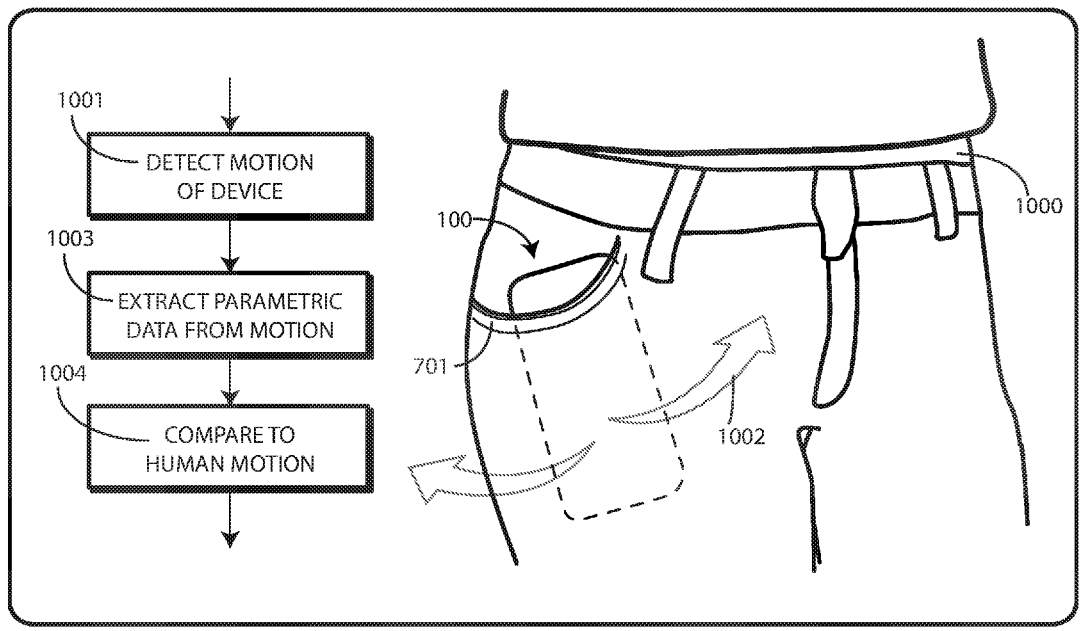
FIG. 10 illustrates one or more method steps in accordance with one or more embodiments of the disclosure.

Turning now to FIG. 10, illustrated therein is the motion detection factor. As shown in FIG. 10, in one embodiment the one or more processors (116) of the electronic device 100 detect 1001 motion 1002 of the electronic device 100. The one or more processors (116) then extract 1003 parametric data from signals corresponding to the motion 1002 as delivered by the motion detector (142). The one or more processors (116) can then compare 1004 the motion to human motion to confirm that the electronic device 100 is disposed along a human body 1000. When the electronic device 100 is disposed in the pocket 701, the one or more processors (116) will detect human motion data.

Figure 11:
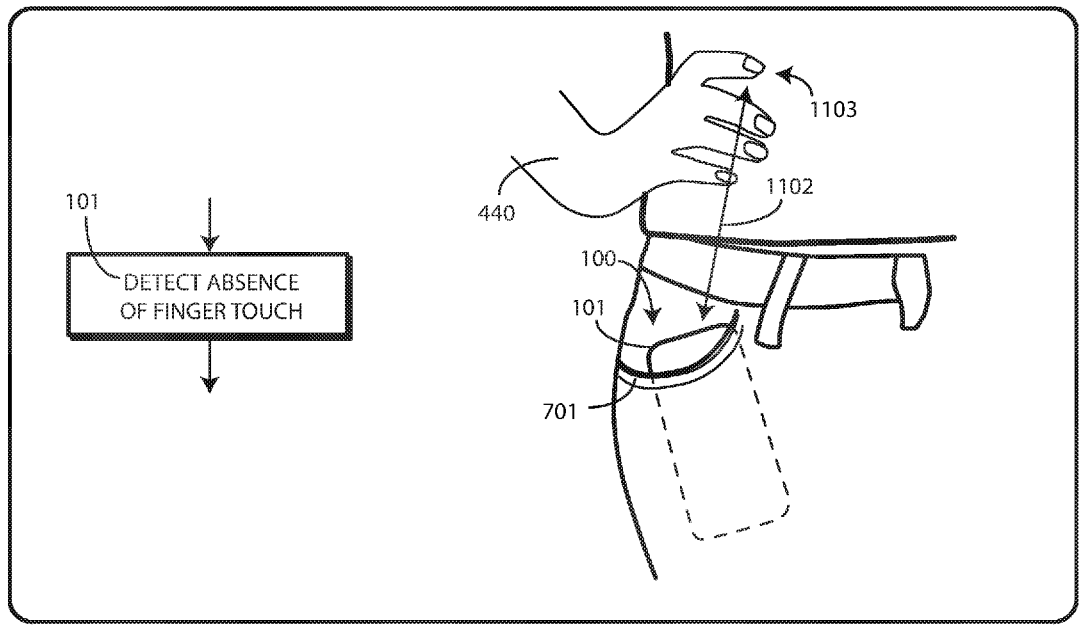
FIG. 11 illustrates one or more method steps in accordance with one or more embodiments of the disclosure.

Turning now to FIG. 11, the one or more processors (116) can also detect 1101 an absence 1102 of finger touch 1103 along a housing 101 of the electronic device 100. When the electronic device 100 is disposed within the pocket 701, the one or more processors (116) will accordingly detect that the user 440 is not touching the electronic device 100.

Figure 12:
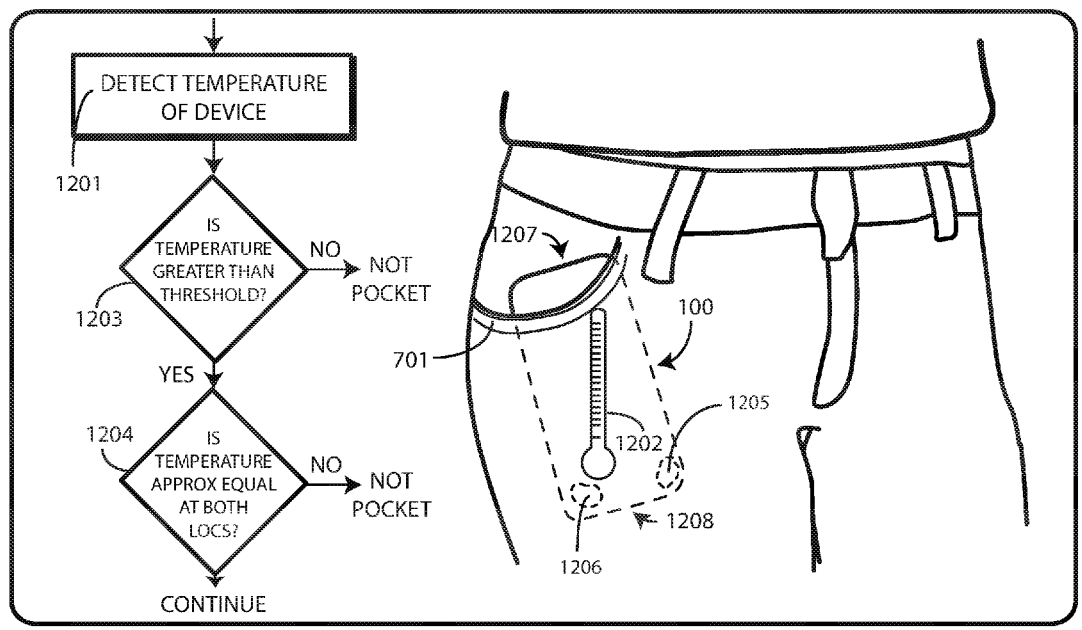
FIG. 12 illustrates one or more method steps in accordance with one or more embodiments of the disclosure.

Turning now to FIG. 12, the one or more processors (116) can detect 1201 the temperature 1202 of the electronic device 100 using the temperature sensor (211) or alternatively the proximity sensor components (140). This temperature detection can be done for the electronic device 100 overall, at selective locations 1205,1206, or at a first end 1207 and at a second end 1208. In one embodiment, shown at decision 1203, the one or more processors (116) can determine if the temperature of the first location 1205 of the electronic device 100 and/or the temperature at the second location 1206 of the electronic device 100 exceeds a predetermined threshold, such as eighty degrees Fahrenheit. Where it does not, the electronic device 100 may be stored in another vessel such as a drawer. Where it is, this optional decision 1203 can confirm that the electronic device 100 is actually disposed within the pocket 701.

In one or more embodiments, as shown at decision 1204, the one or more processors (116) can detect a temperature 1202 of the electronic device 100 at both the first location 1205 and at the second location 1206. The one or more processors (116) can determine whether these temperatures define an approximately common temperature. In one embodiment, where the temperature 1202 is an approximately common temperature, this can indicate that there is no significant differential as would be the case if the user was holding either the first end 1207 or the second end 1208 in their had with the other end in the air. This is indicative of the electronic device 100 being disposed within the pocket 701.

Figure 13:
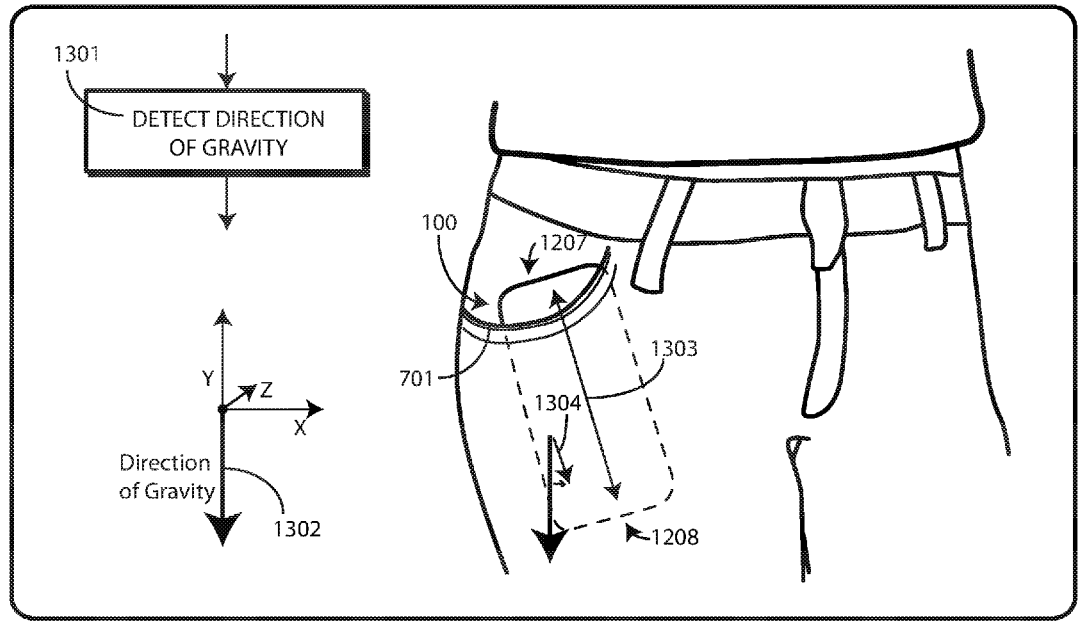
FIG. 13 illustrates one or more method steps in accordance with one or more embodiments of the disclosure.
Figure 14:
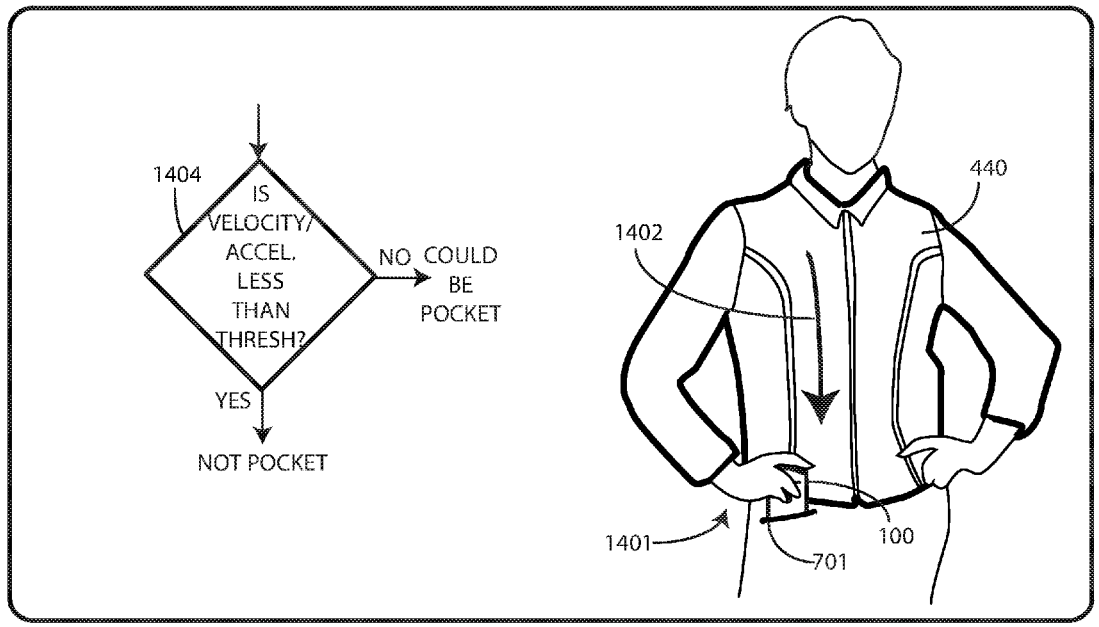
FIG. 14 illustrates one or more method steps in accordance with one or more embodiments of the disclosure.
Figure 15:
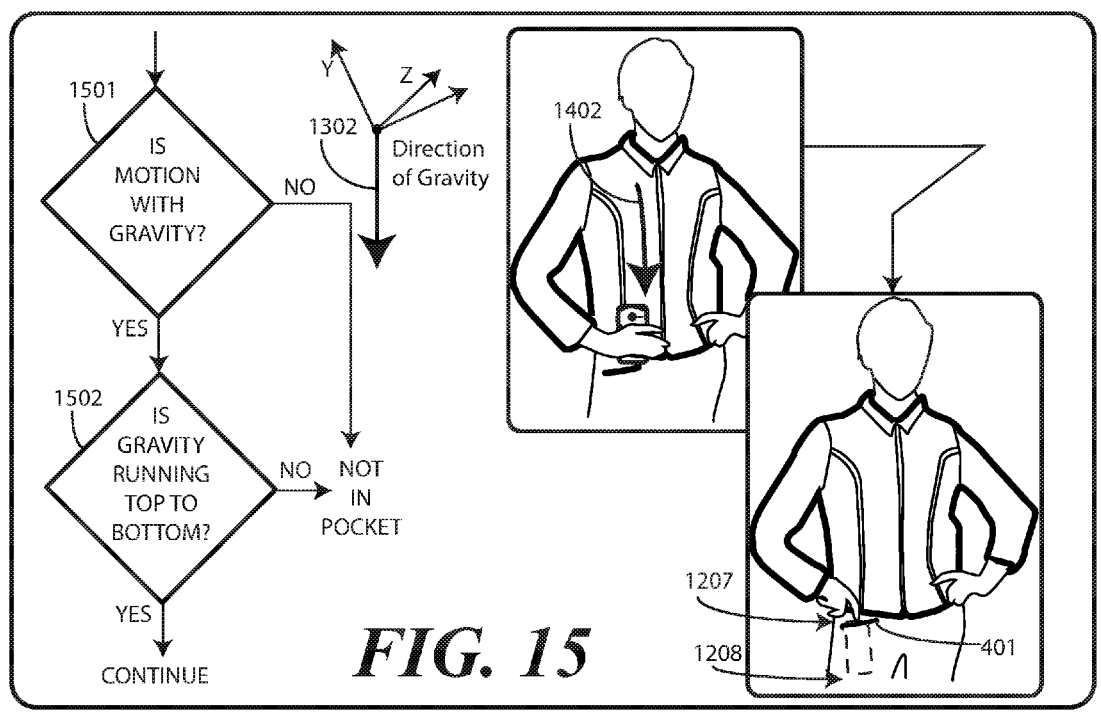
FIG. 15 illustrates one or more method steps in accordance with one or more embodiments of the disclosure.

In one or more embodiments, after executing the method steps shown in FIGS. 10-12, the one or more processors (116) can confirm that the electronic device 100 is disposed within the pocket 701 when the motion (1002), as determined by the motion detector (142) includes parametric data corresponding to human movement, the absence of finger touch (1103) is confirmed, and the temperature 1202 at the first location 1205 and the second location 1206 is within a predefined range. There are additional, optional steps that can be performed ensure that the conclusion that the electronic device 100 is disposed within the pocket 701 has a lower margin of error. Turning now to FIGS. 13-15, illustrated therein are a few such steps. Others will be obvious to those of ordinary skill in the art having the benefit of this disclosure.

Beginning with FIG. 13, in one or more embodiments, the one or more processors (116) are further operable to determine 1301 a gravity direction 1302 relative to the electronic device 100. This can be done with the accelerometer in one embodiment. In one or more embodiments, the one or more processors (116) are further operable to determine an orientation 1303 of the electronic device 100 once the electronic device 100 has been placed within the pocket 701. Accordingly, in one or more embodiments the one or more processors (116) confirm that at least a component 1304 of the gravity direction 1302 runs from a first end 1207 of the electronic device 100 to a second end 1208 of the electronic device 100 to confirm the in-pocket status, as the electronic device 100 will generally be right side up or upside down when in a front or rear pants pocket.

Turning now to FIG. 14, the user 440 is shown placing 1401 the electronic device 100 within her pocket 701. The movement 1402 used to place the electronic device 100 in the pocket 701 has associated therewith a velocity and acceleration. In one embodiment the one or more processors (116) can determine 1404, with the motion detector (142) whether the movement 1402 and/or motion profile, which can include velocity and acceleration, duration, and the stopping of the motion occurring during the movement 1402 exceeds a predetermined threshold 1405. In one embodiment, a predetermined acceleration threshold is about 0.5 meters per second square net of gravity. Embodiments of the disclosure contemplate that the user 440 will take care to ensure that the electronic device 100 is safely placed within the pocket 701. Accordingly, the movement 1402 will be slow and deliberate. Additionally, when a person is walking, the motion (1002) of the electronic device 100 will be slow as well. By confirming that characteristics of the movement, such as velocity and acceleration 1403 are below a predefined threshold, this can serve as an additional confirmation of the in-pocket condition.

In one or more embodiments, the acceleration determination can be used in other ways as well. First, it can be used to confirm that the movement 1402 moving the electronic device 100 occurred with the gravity direction (1302), i.e., downward, as would be the case when placing the electronic device 100 in a pocket 701, but not when raising the electronic device 100 to the user's ear. Second, by comparing the acceleration to a predetermined threshold, the acceleration can be used to confirm that a user is actually placing the electronic device 100 in a pocket 701 rather than performing some other operation, such as waving the electronic device 100 around. Other uses for the acceleration data will be obvious to those of ordinary skill in the art having the benefit of this disclosure.

Illustrating by example, and turning now to FIG. 15, the one or more processors (116) can compare the movement 1402 to the gravity direction 1302. For example, in one embodiment the one or more processors can determine 1501 whether at least some of the movement 1402 was against the gravity direction 1302. Similarly, in one embodiment the one or more processors (116) can determine 1502 whether a component of the gravity direction 1302 runs from a predefined first end 1207 of the electronic device 100 to a predetermined second end 1208 of the electronic device 100.

Figure 16:
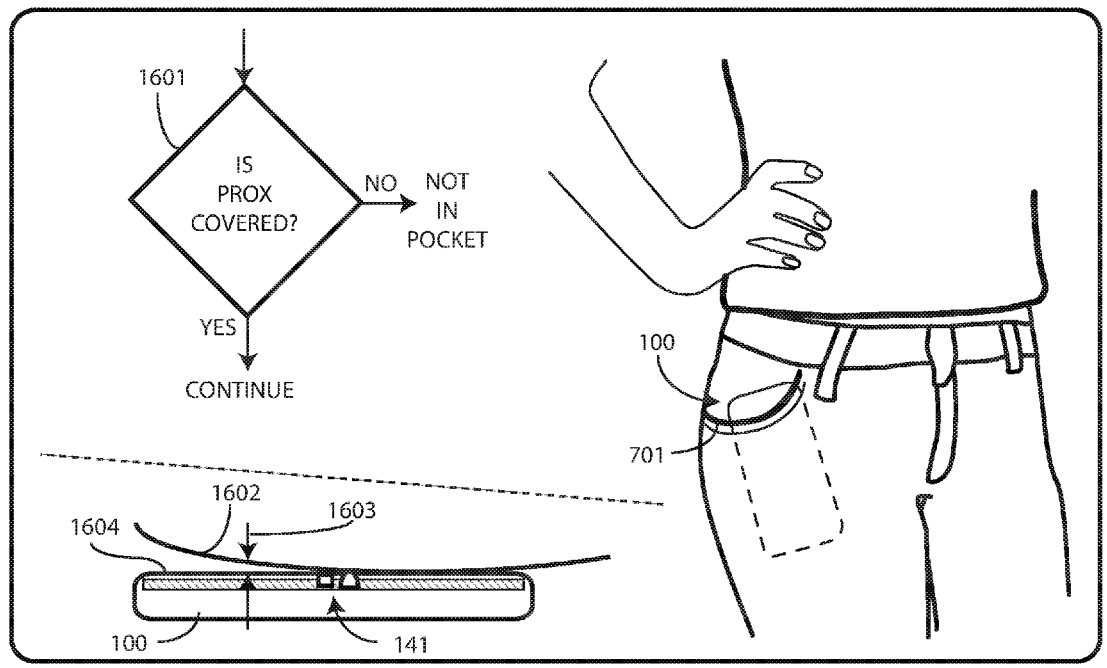
FIG. 16 illustrates one or more method steps in accordance with one or more embodiments of the disclosure.

Turning to FIG. 16, the one or more processors (116) can further confirm that the electronic device 100 is in the pocket 701 by determining 1601 whether an object 1602, such as clothing, textile materials, or other natural, synthetic, or blend layer is covering the electronic device 100. This determination 1601 can be made when the one or more processors (116) receive signals from the one or more proximity detector components 141 indicating that an object 1602, such as textile material, is less than a predefined distance 1603 from a surface 1604 of the electronic device 100, thereby indicating that the electronic device 100 is covered by the object 1602.

Figure 17:
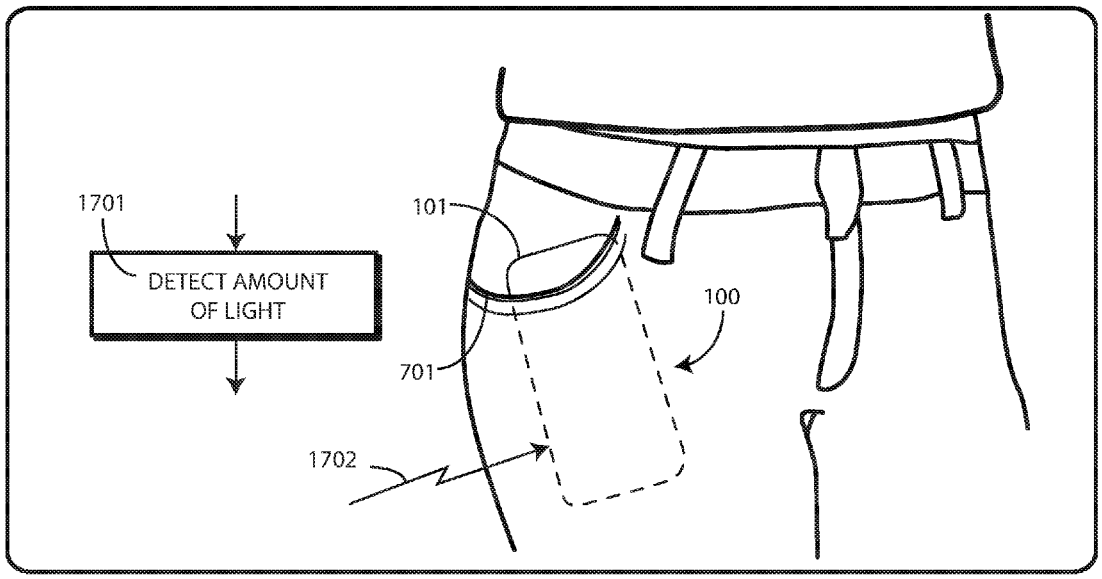
FIG. 17 illustrates one or more method steps in accordance with one or more embodiments of the disclosure.

Turning now to FIG. 17, the one or more processors (116) can determine 1701, with a light sensor (207), whether ambient or direct light 1702 is incident on the housing 101 of the electronic device 100. Of course, when the electronic device 100 is covered by the pocket 701, ambient or direct light 1702 is generally not incident on the housing 101. In the example of FIG. 17, some of the housing 101 is exposed from the pocket 701. However, the vast majority of the housing 101 is within the pocket 701. Modern light sensors (207) are more than capable of determining that the majority of the housing 101 is covered. Accordingly, in one or more embodiments the determination that the electronic device 100 is disposed within the pocket 701 can further include determining, with a light sensor (207), that ambient or direct light 1702 is not incident on the housing 101.

The factors listed above can be used in the function of determining whether the electronic device 100 is disposed within a pocket 701 alone or in combination. For example, the function can consider one, two, three, or all of the factors. Considering more factors assists in preventing false detection of the in-pocket condition. Embodiments of the disclosure contemplate that a user should be minimally affected due to false detection. Accordingly, in one embodiment the one or more processors (116) consider all factors. However, subsets of the factors can be useful in many applications.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with a fingerprint sensor, false fingerprint data;
    determining, with one or more sensors operable with one or more processors, whether the electronic device is disposed within a pocket; and
    where both false fingerprint data is detected and the electronic device is disposed within the pocket, transitioning, with the one or more processors, the fingerprint sensor from an active mode to a low power or sleep mode.

2. The method of claim 1, further comprising:
    adjusting, with the one or more processors, a sensitivity of the fingerprint sensor;
    receiving, with the fingerprint sensor, additional fingerprint data; and
    determining, with the one or more processors, the additional fingerprint data is false.

3. The method of claim 2, the adjusting comprising increasing the sensitivity of the fingerprint sensor.

4. The method of claim 2, the adjusting comprising decreasing the sensitivity of the fingerprint sensor.

5. The method of claim 2, further comprising detecting an object touching the fingerprint sensor, the adjusting occurring while the object is touching the fingerprint sensor.

6. The method of claim 2, the determining the additional fingerprint data is false comprising:
    assigning a quality score to the additional fingerprint data; and
    determining whether the quality score falls below a predefined threshold.

7. The method of claim 1, the determining a function of at least:
    motion of the electronic device;
    an absence of finger touch along an exterior of the electronic device; and
    an approximately common temperature occurring at both a first location of the electronic device and a second location of the electronic device.

8. The method of claim 1, further comprising:
    detecting, with the one or more sensors, removal of the electronic device from the pocket; and
    returning, with the one or more processors, the fingerprint sensor to the active mode.

9. A method in an electronic device, the method comprising:
    detecting, with a fingerprint sensor, first false fingerprint data;
    adjusting, with one or more processors operable with the fingerprint sensor, operation of the fingerprint sensor;
    detecting, with the fingerprint sensor, at least second false fingerprint data;
    upon detecting the at least second false fingerprint data, determining, with one or more sensors operable with the one or more processors, whether the electronic device is disposed within a pocket; and
    where the electronic device is disposed within the pocket, placing, with the one or more processors, the fingerprint sensor in a low power or sleep mode.

10. The method of claim 9, the adjusting comprising increasing a sensitivity of the fingerprint sensor.

11. The method of claim 10, the adjusting further comprising decreasing the sensitivity of the fingerprint sensor after the increasing the sensitivity of the fingerprint sensor.

12. The method of claim 11, further comprising detecting an object touching the fingerprint sensor, the adjusting occurring while the object is touching the fingerprint sensor.

13. The method of claim 9, further comprising detecting, prior to the determining and after the adjusting, with the fingerprint sensor, at least third false fingerprint data.

14. An electronic device, comprising:
a user interface;
one or more processors operable with the user interface;
the user interface comprising:
   a fingerprint sensor; and
   one or more other sensors to determine whether the electronic device is disposed within a pocket;
wherein when the fingerprint sensor detects at least first false fingerprint data, the one or more processors are operable to determine, with the one or more other sensors, whether the electronic device is disposed within the pocket; and
where the electronic device is disposed within the pocket, transition the fingerprint sensor from an active mode to a low power or sleep mode.

15. The electronic device of claim 14, the one or more processors further operable to, prior to determining whether the electronic device is disposed within the pocket, adjust a sensitivity of the fingerprint sensor.

16. The electronic device of claim 15, the one or more processors operable to continue to adjust the sensitivity until an object proximately located with the fingerprint sensor is removed from the fingerprint sensor.

17. The electronic device of claim 15, the one or more processors further operable to, prior to determining whether the electronic device is disposed within the pocket, receive at least second false fingerprint data.

18. The electronic device of claim 16, the one or more processors operable to adjust the sensitivity by both increasing the sensitivity and decreasing the sensitivity.

19. The electronic device of claim 14, the one or more processors further operable to determine sensed data is the at least first false fingerprint data by assigning a quality score to the sensed data.

20. The electronic device of claim 19, the quality score a function of one or more of:
   a number of fingerprint features found in the sensed data;
   a signal to noise ratio in the sensed data;
   a contrast of the sensed data; or
   combinations thereof.

* * * * *